United States Patent
Martin-Vaca et al.

(10) Patent No.: US 7,999,061 B2
(45) Date of Patent: Aug. 16, 2011

(54) CATALYTIC LACTIDE AND GLYCOLIDE (CO)POLYMERIZATION SYSTEM

(75) Inventors: Blanca Martin-Vaca, Toulouse (FR); Anca Dumitrescu, Toulouse (FR); Lidija Vranicar, Toulouse (FR); Jean-Bernard Cazaux, Aramon (FR); Didier Bourissou, Plaisance du Touch (FR); Roland Cherif-Cheikh, Castelldefels (ES); Frédéric Lacombe, San Cugat Del Valles (ES)

(73) Assignee: IPSEN Pharma S.A.S., Boulogne-Billancourt (FR)

( * ) Notice: Subject to any disclaimer, the term of this patent is extended or adjusted under 35 U.S.C. 154(b) by 0 days.

(21) Appl. No.: 12/316,328

(22) Filed: Dec. 11, 2008

(65) Prior Publication Data

US 2009/0171066 A1 Jul. 2, 2009

Related U.S. Application Data

(62) Division of application No. 10/541,735, filed as application No. PCT/FR2004/00100 on Jan. 19, 2004, now abandoned.

(30) Foreign Application Priority Data

Jan. 21, 2003 (EP) .................... 03290134

(51) Int. Cl.
*C08G 63/08* (2006.01)
*C08G 63/82* (2006.01)
*C08F 283/00* (2006.01)
*C08G 63/91* (2006.01)
*C08G 63/48* (2006.01)

(52) U.S. Cl. ........ 528/354; 528/355; 528/486; 528/487; 528/495; 528/499; 525/419; 525/420; 502/103; 502/168; 502/172; 502/216; 502/217

(58) Field of Classification Search .............. 528/354, 528/355, 486, 487, 495, 499; 525/419, 420; 502/103, 168, 172, 216, 217
See application file for complete search history.

(56) References Cited

FOREIGN PATENT DOCUMENTS

| JP | 0784044 | * | 7/1997 |
| JP | 0953589 | * | 3/1999 |

* cited by examiner

*Primary Examiner* — Duc Truong
(74) *Attorney, Agent, or Firm* — Hunton & Williams LLP

(57) ABSTRACT

A catalytic lactide and glycolide copolymerization system comprising a trifluoromethane sulfonate as a catalyst and copolymerization additive and a copolymerization process.

15 Claims, No Drawings

CATALYTIC LACTIDE AND GLYCOLIDE (CO)POLYMERIZATION SYSTEM

This application is a division of U.S. patent application Ser. No. 10/541,735 filed Jul. 7, 2005, now abandoned which is a 371 of PCT/FR2004/000100 filed Jan. 19, 2004.

The present invention relates to a catalytic lactide and glycolide (co)polymerization system, said system comprising a trifluoromethanesulfonate as a catalyst and a (co)polymerization additive. The present invention also relates to a lactide and glycolide (co)polymerization process including the use of such a catalytic system.

These days, there is increasing attention paid to synthetic polymers for the development of artificial organs and the formulation of medicaments [*Chem. Eng. News* 2001, 79 (6), 30]. The polymers concerned must meet a certain number of criteria and, in particular, they must be biocompatible. The biodegradable character is an additional advantage if the polymer is to be eliminated after an appropriate implantation period in an organism. In this respect, the copolymers based on lactic and glycolic acid (PLGA) have a great advantage because they are sensitive to hydrolysis and are degraded in vivo with the release of non-toxic by-products. The range of uses of PLGAs is vast (*Adv. Mater.* 1996, 8, 305 and *Chemosphere* 2001, 43, 49). In the surgical field, they are used for the synthesis of multifilament threads, sutures, implants, prostheses etc. In pharmacology, they allow the encapsulation, transfer and controlled release of active ingredients.

For all these uses, the key factor is the degradation rate of PLGAs which depends of course on their structure (chain length, dispersity, proportion, stereochemistry and chaining of monomers etc.). In recent years, numerous works have therefore been dedicated to the development of catalysts and/or initiators of (co)polymerization, i.e. polymerization or copolymerization, of lactide and glycolide allowing the preparation of PLGAs with controlled structure.

The use of metallic systems usually leads to a contamination of the thus-obtained copolymers through the presence of metallic salts, which sometimes constitutes a serious limitation depending on the uses envisaged. The development of non-metallic systems allowing controlled lactide and glycolide (co)polymerization is therefore an important consideration.

The applicant therefore proposes a simple catalytic system, comprising a catalyst and a (co)polymerization additive, and which allows control of the chain length but also of the nature of the chain ends of the prepared (co)polymers.

The subject of the present invention is therefore a catalytic system comprising
(a) a trifluoromethanesulfonate of general formula (1)

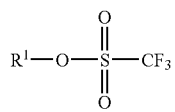 (1)

in which
R$^1$ represents a hydrogen or deuterium atom, or a group of formula -E14(R$_{14}$)(R'$_{14}$)(R''$_{14}$);
E$_{14}$ is an element of group 14;
R$_{14}$, R'$_{14}$ and R''$_{14}$ represent, independently, the hydrogen, deuterium atom or one of the following substituted or non-substituted radicals: alkyl, cycloalkyl or aryl, and in which said substituent or substituents are chosen from: halo, alkyl, cycloalkyl and aryl,
as catalyst, and
(b) a (co)polymerization additive of general formula (2)

 (2)

in which
E represents an element of group 16;
R$^2$ represents a hydrogen or deuterium atom;
R$^3$ represents a hydrogen or deuterium atom, or a group of formula -E'$_{14}$(T$_{14}$)(T'$_{14}$)(T''$_{14}$);
E'$_{14}$ is an element of group 14;
T$_{14}$, T'$_{14}$ and T''$_{14}$ represent, independently, the hydrogen atom; the deuterium atom; one of the following substituted or non-substituted radicals: alkyl, cycloalkyl or aryl, and in which said substituent or substituents are chosen from: halo, hydroxy, alkyl, alkoxy, cycloalkyl, cycloalkoxy, aryl, aryloxy, carboxy, alkoxycarbonyl, cycloalkoxycarbonyl and aryloxycarbonyl
for lactide and glycolide (co)polymerization.

The expression halo signifies fluoro, chloro, bromo or iodo, and preferably chloro. The expression alkyl preferably represents a linear or branched alkyl radical having 1 to 6 carbon atoms and in particular an alkyl radical having 1 to 4 carbon atoms such as the methyl, ethyl, propyl, isopropyl, butyl, isobutyl, sec-butyl and ter-butyl radicals. The term alkoxy designates the radicals in which the alkyl radical is as defined above such as for example the methoxy, ethoxy, propyloxy or isopropyloxy radicals but also linear, secondary or tertiary butoxy, pentyloxy. The term alkoxycarbonyl preferably designates the radicals in which the alkoxy radical is as defined above such as for example methoxycarbonyl, ethoxycarbonyl.

The cycloalkyl radicals are chosen from the saturated or unsaturated monocyclic cycloalkyls. The saturated monocyclic cycloalkyl radicals can be chosen from the radicals having 3 to 7 carbon atoms such as the cyclopropyl, cyclobutyl, cyclopentyl, cyclohexyl or cycloheptyl radicals. The unsaturated cycloalkyl radicals can be chosen from the cyclobutene, cyclopentene, cyclohexene, cyclopentadiene, cyclohexadiene radicals. The term cycloalkoxy designates the radicals in which the cycloalkyl radical is as defined above such as for example the cyclopropyloxy, cyclobutyloxy, cyclopentyloxy, cyclohexyloxy, cycloheptyloxy, cyclobutenyloxy, cyclopentenyloxy, cyclohexenyloxy, cyclopentadienyloxy, cyclohexadienyloxy radicals. The term cycloalkoxycarbonyl designates the radicals in which the cycloalkoxy radical is as defined above such as for example the cyclopropyloxycarbonyl, cyclobutyloxycarbonyl, cyclopentyloxycarbonyl, cyclohexyloxycarbonyl, cycloheptyloxycarbonyl, cyclobutenyloxycarbonyl, cyclopentanyloxycarbonyl, cyclohexanyloxycarbonyl radicals.

The aryl radicals can be of mono- or polycyclic type. The monocyclic aryl radicals can be chosen from the phenyl radicals optionally substituted by one or more alkyl radicals such as tolyl, xylyl, mesityl, cumenyl. The polycyclic aryl radicals can be chosen from the naphthyl, anthryl, phenanthryl radicals. The term aryloxy designates the radicals in which the aryl radical is as defined above such as for example the phenyloxy, tolyloxy, naphthyloxy, anthryloxy and phenanthryloxy radicals. The term aryloxycarbonyl preferably designates the radicals in which the aryloxy radical is as defined above, such as for example phenyloxycarbonyl, tolyloxycarbonyl.

In the present application, the term (co)polymerization signifies polymerization or copolymerization. Thus lactide and glycolide (co)polymerization covers lactide polymerization, glycolide polymerization but also lactide and glycolide copolymerization.

Preferably, in a catalytic system according to the present invention, the quantity of the (co)polymerization additive with respect to the catalyst is comprised between 0.05 and 5 molar equivalents and, very preferably, between 0.5 and 2 molar equivalents.

A subject of the invention is more particularly a catalytic system as defined above, with a compound of formula (1) in which $R^1$ represents either a hydrogen atom or a group of formula $-E_{14}(R_{14})(R'_{14})(R''_{14})$.

Preferably $R^1$ represents the hydrogen atom and compound (I) thus represents trifluoromethanesulphonic acid. Preferably also, $R^1$ represents a group of formula $-E_{14}(R_{14})(R'_{14})(R''_{14})$ in which $E_{14}$ is a carbon or silicon atom, very preferably $E_{14}$ is a carbon atom and $R_{14}$, $R'_{14}$ and $R''_{14}$ represent, independently, a hydrogen atom or an alkyl radical.

According to the present invention, the (co)polymerization additive of formula (2) thus used acts as a (co)polymerization initiator (or co-initiator). Its presence is indispensable because in the absence of such a compound of formula (2), the (co)polymerization reactions are much slower, lead to much lower yields, are not reproducible, and therefore cannot be exploited industrially.

A more particular subject of the invention is a catalytic system as defined above, with a compound of general formula (2) in which E represents an oxygen or sulphur atom;
$R^2$ represents a hydrogen atom;
$R^3$ represents a hydrogen atom or a group of formula $-E'_{14}(T_{14})(T'_{14})(T''_{14})$;
$E'_{14}$ is an carbon or silicon atom;
$T_{14}$, $T'_{14}$ and $T''_{14}$ represent, independently, the hydrogen atom, or one of the following substituted or non-substituted radicals: alkyl, cycloalkyl or aryl, in which said substituent or substituents are chosen from: halo, alkyl, cycloalkyl, phenyl, naphthyl, carboxy and alkoxycarbonyl, and more particularly, E represents an oxygen atom;
$R^2$ a hydrogen atom;
$R^3$ a hydrogen atom or a group of formula $-E'_{14}(T_{14})(T'_{14})(T''_{14})$ in which $E'_{14}$ represents a carbon atom and $T_{14}$, $T'_{14}$ and $T''_{14}$ represent, independently, the hydrogen atom or an alkyl radical.

A more particular subject of the invention is a catalytic system as defined above and characterized in that the (co)polymerization additive of general formula (2) is water or an aliphatic alcohol. Among the aliphatic alcohols, there can be mentioned for example methanol, ethanol, n-propanol, isopropanol, n-butanol or pentan-1-ol. Preferably, the aliphatic alcohol is chosen from isopropanol and pentan-1-ol.

A subject of the invention is also a lactide and glycolide (co)polymerization process which consists of bringing together the monomer or monomers considered, a catalytic system as defined above comprising a compound of general formula (1) and a (co)polymerization additive of general formula (2), and optionally a polymerization solvent.

The lactide and glycolide (co)polymerization according to the invention is carried out by ring-opening (co)polymerization. Such a process can be carried out either in solution or in surfusion. When the (co)polymerization is carried out in solution, the reaction solvent can be the (or one of the) substrate(s) used in the catalytic reaction. Solvents which do not interfere with the catalytic reaction itself are also suitable. As an example of such solvents, the aromatic hydrocarbons (such as toluene, a xylene or mesitylene) can be mentioned, optionally substituted by one or more nitro groups (such as nitrobenzene), ethers (such as methyltertbutylether, tetrahydrofuran or dioxane), aliphatic or aromatic halides (such as dichloromethane, chloroform, dichloroethane or a dichlorobenzene).

According to the process of the present application, the reactions are carried out at temperatures comprised between −20° C. and approximately 150° C. In the case where the (co)polymerization is carried out in solution, the temperature is preferably comprised between 0° C. and 30° C. The reaction times are comprised between a few minutes and 48 hours, and preferably between 30 minutes and 20 hours. The quantity of the (co)polymerization additive with respect to the catalyst is preferably comprised between 0.05 and 5 molar equivalents and, very preferably, between 0.5 and 2 molar equivalents. The yield of a (co)polymerization process according to the present invention is generally higher than 80% and can even reach 100% under relatively mild conditions (ambient temperature, a few hours) as illustrated in the examples.

A more particular subject of the invention is also a process as defined above, with a catalytic system as defined above which contains the compound of formula (1) in which $R^1$ represents either a hydrogen atom or a group of formula $-E_{14}(R_{14})(R'_{14})(R''_{14})$.

Preferably, a subject of the invention is a process as defined above characterized in that $R^1$ represents the hydrogen atom, in this case, compound (1) represents trifluoromethanesulphonic acid. Preferably also, a subject of the invention is a process as defined above characterized in that $R^1$ represents a group of formula $-E_{14}(R_{14})(R'_{14})(R''_{14})$ in which $E_{14}$ is a carbon or silicon atom, and very preferably $E_{14}$ is a carbon atom and $R_{14}$, $R'_{14}$, $R''_{14}$ represent a hydrogen atom or an alkyl radical.

A more particular subject of the invention is also a (co)polymerization process as defined above, with a catalytic system as defined above which contains the compound of general formula (2) in which E represents an oxygen or sulphur atom;
$R^2$ represents a hydrogen atom;
$R^3$ represents a hydrogen atom or a group of formula $-E'_{14}(T_{14})(T'_{14})(T''_{14})$;
$E'_{14}$ is a carbon or silicon atom;
$T_{14}$, $T'_{14}$ and $T''_{14}$ represent, independently, the hydrogen atom, or one of the following substituted or non-substituted radicals: alkyl, cycloalkyl or aryl, in which said substituent or substituents are chosen from: halo, alkyl, cycloalkyl, phenyl, naphthyl, carboxy and alkoxycarbonyl, and more particularly, E represents an oxygen atom;
$R^2$ a hydrogen atom;
$R^3$ a hydrogen atom or a group of formula $-E'_{14}(T_{14})(T'_{14})(T''_{14})$ in which $E'_{14}$ represents a carbon atom and $T_{14}$, $T'_{14}$ and $T''_{14}$ represent, independently, the hydrogen atom or an alkyl radical.

A more particular subject of the invention is a lactide and glycolide (co)polymerization process as defined above, with a catalytic system the (co)polymerization additive of which is either water or an aliphatic alcohol, and preferably the aliphatic alcohol is chosen from methanol, ethanol, propanol and butanol.

The lactide and glycolide (co)polymerization process according to the present invention therefore allows control of the nature of the (co)polymer chain ends and is particularly suitable for obtaining (co)polymers with acid-alcohol or ester-alcohol ends as illustrated in the experimental part.

The lactide and glycolide (co)polymerization process according to the present invention is also particularly well suited for obtaining (co)polymers of mass comprised between 500 and 50,000 Dalton, more particularly between 1,000 and 20,000 Dalton.

The lactide and glycolide (co)polymerization process according to the present invention has numerous advantages, in particular,

- the catalytic system comprises a catalyst and a (co)polymerization additive which are easily accessible and inexpensive;
- the use of an additive as (co)polymerization initiator allows not only a very significant improvement in the progress of the (co)polymerization but also the precise control of the chain length which is practically equal to the initial monomer to initiator ratio;
- the use of an additive as (co)polymerization initiator also allows control of the nature of the chain ends of the (co)polymers prepared;
- the (co)polymerization can be carried out under particularly mild temperatures, such as at ambient temperature, without the reaction times required for a near total conversion of the monomer or monomers exceeding a few hours and at most 24 hours;
- the (co)polymerization can really be carried out in homogenous medium so that the mass distribution of the (co) polymers obtained is narrow, the polydispersity indices of the (co)polymers obtained according to the present invention are in fact comprised between 1.0 and 1.5;
- the (co)polymers obtained can be simply, quickly and effectively purified without modification of their properties. The traces of residual monomers as well as the residues of catalysts are in fact quantitatively eliminated by simple filtration on basic alumina and/or biphasic washing with a diluted aqueous solution of hydrogen carbonate.

The invention finally relates to lactide and glycolide polymers or copolymers which are obtained or are able to be obtained by implementing a process as described above. Such (co)polymers can have controlled acid-alcohol or ester-alcohol ends. Such (co)polymers can also be of low mass, with a mass comprised between 500 and 50,000 Dalton, and preferably between 1,000 and 20,000 Dalton.

A subject of the present invention is lactide and glycolide (co)polymers with controlled acid-alcohol or ester-alcohol ends. A subject of the present invention is also lactide and glycolide (co)polymers with a mass comprised between 500 and 50,000 Dalton, and preferably between 1,000 and 20,000 Dalton. Particularly preferably, a subject of the present invention is lactide and glycolide (co)polymers with controlled acid-alcohol or ester-alcohol ends and with a mass comprised between 500 and 50,000 Dalton, and preferably between 1000 and 20,000 Dalton.

The products of general formula (1) and (2) are available commercially or can be produced by the processes known to a person skilled in the art.

Unless specified otherwise, all the technical and scientific terms used in the present application have the same meaning as that usually understood by an ordinary specialist in the field to which the invention belongs. Similarly, all the publications, patent applications and all other references mentioned in the present application, are incorporated by way of reference.

The following examples are presented to illustrate the above procedures and should in no event be considered as a limit to the scope of the invention.

EXAMPLE 1

Preparation of a (D,L-Lactide) Polymer with Acid-Alcohol Ends 22 g of D,L-lactide (0.153 mol), 150 ml of dichloromethane, 1.35 ml of trifluoromethanesulphonic acid (0.0153 mol) and 0.3 ml of water (0.0153 mol) are successively introduced into a Schlenk tube equipped with a magnetic stirrer and purged under argon. The reaction mixture is left under stirring at ambient temperature. The progress of polymerization is monitored by proton NMR. After reaction of three hours, the conversion of the monomer is 100%. Basic alumina is then added to the reaction mixture. After stirring for one hour, the medium is filtered on frit and the solvent is eliminated under reduced pressure. According to a GPC (Gel Permeation Chromatography) analysis using a calibration carried out from polystyrene standards (PS) of masses of 761 to 400,000, the sample is composed of polymers having similar masses (Mw=2600 Dalton, Mw/Mn=1.48). The nature of the acid-alcohol chain ends is determined by mass spectrometry (electrospray ionization, detection in positive ion mode, sample dissolved in acetonitrile with a trace of ammonium hydroxide).

EXAMPLE 2

Preparation of a (D,L-Lactide) Polymer with Ester-Alcohol Ends 22 g of D,L-lactide (0.153 mol), 150 ml of dichloromethane, 1.35 ml of trifluoromethanesulphonic acid (0.0153 mol) and 1.17 ml of isopropanol (0.0153 mol) are successively introduced into a Schlenk tube equipped with a magnetic stirrer and purged under argon. The reaction mixture is left under stirring at ambient temperature for three hours. Basic alumina is then added to the reaction mixture. After stirring for one hour, the medium is filtered on frit and the solvent is eliminated under reduced pressure. The polymer is characterized by proton NMR; the conversion of the monomer is 100%. According to a GPC (Gel Permeation Chromatography) analysis using a calibration carried out from polystyrene standards (PS) of masses of 761 to 400,000, the sample is composed of polymers having similar masses (Mw=2070 Dalton, Mw/Mn=1.25). The nature of the ester-alcohol chain ends is determined by mass spectrometry (electrospray ionization, detection in positive ion mode, sample dissolved in acetonitrile with a trace of ammonium hydroxide).

EXAMPLE 3

Preparation of a (D,L-Lactide/Glycolide) Copolymer 75/25 with Ester-Alcohol Ends 16.5 g of D,L-lactide (0.115 mol) and 4.4 g of glycolide (0.038 mol) dissolved in 150 ml of dichloromethane are introduced into a Schlenk tube equipped with a magnetic stirrer and purged under argon. Then 1.35 ml of trifluoromethanesulphonic acid (0.0153 mol) and 1.17 ml of isopropanol (0.0153 mol) are successively added. The reaction mixture is left under stirring at ambient temperature for two hours. Basic alumina is then added to the reaction mixture. After stirring for one hour, the medium is filtered on frit and the solvent is eliminated under reduced pressure. The polymer is characterized by proton NMR: the conversion of each of the monomers is greater than 95%. The ratio of the signal integrals corresponding to the polylactide part (5.2 ppm) and polyglycolide part (4.85 ppm) allows the composition of the copolymer to be evaluated as 79% lactide and 21% glycolide. According to a GPC (Gel Permeation Chromatography) analysis using a calibration carried out from polystyrene standards (PS) of masses of 761 to 400,000, the sample is composed of copolymers having similar masses (Mw=2100 Dalton, Mw/Mn=1.34). The nature of the chain ends is determined by mass spectrometry (electrospray ionization, detection in positive ion mode, sample dissolved in acetonitrile with a trace of ammonium hydroxide).

EXAMPLE 4

Preparation of a (D,L-Lactide) Polymer with Ester-Alcohol Ends 22 g of D,L-lactide (0.153 mol), 150 ml of dichloromethane, 190 µl of trifluoromethanesulphonic acid (0.002 mol) and 170 µl of isopropanol (0.002 mol) are successively introduced into a Schlenk tube equipped with a magnetic stirrer and purged under argon. The reaction mixture is left under stirring at ambient temperature for ten hours. Basic alumina is then added to the reaction mixture. After stirring for one hour, the medium is filtered on frit and the solvent is eliminated under reduced pressure. The polymer is characterized by proton NMR; the conversion of the monomer is 100%. The presence of the isopropyl ester chain end is also demonstrated by proton NMR. According to a GPC (Gel Permeation Chromatography) analysis using a calibration carried out from polystyrene standards (PS) of masses of 761 to 400,000, the sample is composed of polymers having similar masses (Mw=13,000 Dalton, Mw/Mn=1.15).

EXAMPLE 5

Preparation of a (D,L-Lactide) Oligomer with Ester-Alcohol Ends (Mw Close to 1,000 Da)

19.39 g of D,L-lactide (0.135 mol), 160 ml of dichloromethane, 3.00 ml of trifluoromethanesulphonic acid (0.0336 mol) and 3.65 ml of pentan-1-ol (0.0336 mol) are successively introduced into a Schlenk tube equipped with a magnetic stirrer and purged under argon. The reaction mixture is left under stirring at ambient temperature for one hour. Basic alumina is then added to the reaction mixture. After stirring for one hour, the medium is filtered on frit and the solvent is eliminated under reduced pressure. The polymer is characterized by proton NMR; the conversion of the monomer is 100%. According to a GPC analysis (Gel Permeation Chromatography) using a calibration carried out from polystyrene standards (PS) of masses of 761 to 400,000, the sample is composed of polymers having similar masses (Mw=1 008 Dalton, Mw/Mn=1.13). The nature of the ester-alcohol chain ends is determined by mass spectrometry (electrospray ionization, detection in positive ion mode, sample dissolved in acetonitrile with a trace of ammonium hydroxide).

EXAMPLE 6

Preparation of a (D,L-Lactide/Glycolide) 80/20 Co-Oligomer with Ester-Alcohol Ends (Mw Close to 1,000 Da)

18.81 g of D,L-lactide (0.128 mol), 4.00 g of glycolide (0.031 mol) and 160 ml of dichloromethane are introduced into a Schlenk tube equipped with a magnetic stirrer and purged under argon. Then 3.5 ml of trifluoromethanesulphonic acid (0.039 mol) and 3.4 ml of pentan-1-ol (0.039 mol) are successively added. The reaction mixture is left under stirring at ambient temperature for one hour. Basic alumina is then added to the reaction mixture. After stirring for one hour, the medium is filtered on frit and the solvent is eliminated under reduced pressure. The polymer is characterized by proton NMR; the conversion of each of the monomers is greater than 95%. The ratio of the signal integrals corresponding to the polylactide part (5.2 ppm) and polyglycolide part (4.85 ppm) allows the composition of the copolymer to be evaluated as 80% lactide and 20% glycolide. According to a GPC (Gel Permeation Chromatography) analysis using a calibration carried out from polystyrene standards (PS) of masses of 761 to 400,000, the sample is composed of copolymers having similar masses (Mw=1 030 Dalton, Mw/Mn=1.23). The nature of the chain ends is determined by mass spectrometry (electrospray ionization, detection in positive ion mode, sample dissolved in acetonitrile with a trace of ammonium hydroxide).

EXAMPLE 7

Preparation of a (D,L-Lactide/Glycolide) 60/40 Co-Oligomer with Ester-Alcohol Ends (Mw Close to 1,000 Da)

2.68 g of D,L-lactide (0.0186 mol), 1.44 g of glycolide (0.0124 mol) and 40 ml of dichloromethane are introduced into a Schlenk tube equipped with a magnetic stirrer and purged under argon. Then 0.69 ml of trifluoromethanesulphonic acid (0.0077 mol) and 0.85 ml of pentan-1-ol (0.0077 mol) are successively added. The reaction mixture is left under stirring at ambient temperature for two hours. Basic alumina is then added to the reaction mixture. After stirring for one hour, the medium is filtered on frit and the solvent is eliminated under reduced pressure. The polymer is characterized by proton NMR; the conversion of each of the monomers is greater than 95%. The ratio of the signal integrals corresponding to the polylactide part (5.2 ppm) and polyglycolide part (4.85 ppm) allows the composition of the copolymer to be evaluated as 60% lactide and 40% glycolide. According to a GPC (Gel Permeation Chromatography) analysis using a calibration carried out from polystyrene standards (PS) of masses of 761 to 400,000, the sample is composed of copolymers having similar masses (Mw=953 Dalton, Mw/Mn=1.26). The nature of the chain ends is determined by mass spectrometry (electrospray ionization, detection in positive ion mode, sample dissolved in acetonitrile with a trace of ammonium hydroxide).

EXAMPLE 8

Preparation of a (D,L-Lactide) Polymer with Acid-Alcohol Ends and with Mw of Approximately 7,000 Da 22.1 g of D,L-lactide (0.153 mol), 140 ml of dichloromethane, 0.486 ml of trifluoromethanesulphonic acid (0.0055 mol) and 0.10 ml of water (0.0055 mol) are successively introduced into a Schlenk tube equipped with a magnetic stirrer and purged under argon. The reaction mixture is left under stirring at ambient temperature. The progress of polymerization is monitored by proton NMR. After reaction for six hours, the conversion of the monomer is greater than 95%. The reaction medium is transferred into a separating funnel and washed with a saturated aqueous solution of NaHCO$_3$ then with salt water. The solution is dried over anhydrous Na$_2$SO$_4$, filtered, then the solvent is eliminated under reduced pressure. According to a GPC (Gel Permeation Chromatography) analysis using a calibration carried out from polystyrene standards (PS) of masses of 761 to 400,000, the sample is composed of polymers having similar masses (Mw=7 200 Dalton, Mw/Mn=1.32).

The invention claimed is:

1. A method for (co)polymerizing lactide and/or glycolide monomers via a ring-opening (co)polymerization process comprising:
   contacting said lactide and/or glycolide monomers with a catalytic system comprising
   (a) a trifluoromethanesulfonate of the formula

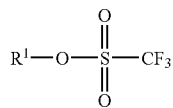   (1)

in which
   R$^1$ is hydrogen, deuterium atom, or -E$_{14}$(R$_{14}$)(R'$_{14}$)(R''$_{14}$);
   E$_{14}$ is an element of group 14;
   R$_{14}$, R'$_{14}$ and R''$_{14}$ are independently hydrogen, deuterium atom, substituted or non-substituted alkyl, cycloalkyl or aryl, and in which said substituent or substituents are halo, alkyl, cycloalkyl or aryl,
   as catalyst, and
   (b) a (co)polymerization additive of the formula

R$^2$-E-R$^3$   (2)

in which
   E is an element of group 16;
   R$^2$ is a hydrogen or deuterium atom;
   R$^3$ is hydrogen, deuterium atom, or -E'$_{14}$(T$_{14}$)(T'$_{14}$)(T''$_{14}$);
   E'$_{14}$ is an element of group 14;
   T$_{14}$, T'$_{14}$ and T''$_{14}$ are, independently, hydrogen; deuterium atom; or substituted or non-substituted alkyl, cycloalkyl or aryl, wherein said substituent or substituents are halo, hydroxy, alkyl, alkoxy, cycloalkyl, cycloalkoxy, aryl, aryloxy, carboxy, alkoxycarbonyl, cycloalkoxycarbonyl or aryloxycarbonyl,
   thereby (co)polymerizing said lactide and/or glycolide monomers.

2. The method of claim 1, wherein the quantity of (co)polymerization additive with respect to the catalyst is between 0.05 and 5 molar equivalents.

3. The method of claim 1, wherein the compound of formula (1) is such that R$^1$ is hydrogen or -E$_{14}$(R$_{14}$)(R'$_{14}$)(R''$_{14}$).

4. The method of claim 1, wherein the compound of formula (1) is such that R$^1$ is hydrogen.

5. The method of claim 1, wherein the compound of formula (1) is such that R$^1$ is -E$_{14}$(R$^{14}$)(R'$_{14}$)(R''$_{14}$) and E$_{14}$ is a carbon or silicon atom.

6. The method of claim 5, wherein E$_{14}$ is a carbon atom and R$_{14}$, R'$_{14}$ and R''$_{14}$ are, independently, hydrogen or alkyl.

7. The method of claim 5, wherein the compound of formula (2) is such that
   E is oxygen or sulfur;
   R$^2$ is hydrogen;
   R$^3$ is hydrogen or -E'$_{14}$(T$_{14}$)(T'$_{14}$)(T''$_{14}$);
   E'$_{14}$ is carbon or silicon;
   T$^{14}$, T'$^{14}$ and T''$^{14}$ are, independently, hydrogen or substituted or non-substituted alkyl, cycloalkyl or aryl, wherein said substituent or substituents are halo, alkyl, cycloalkyl, phenyl, naphthyl, carboxy or alkoxycarbonyl.

8. The method of claim 5, wherein:
   E is oxygen;
   R$^2$ is hydrogen;
   R$^3$ is hydrogen or -E'$_{14}$(T$_{14}$)(T'$_{14}$)(T''$_{14}$) in which E'$_{14}$ is carbon and T$_{14}$, T'$_{14}$ and T''$_{14}$ are, independently, hydrogen or alkyl.

9. The method of claim 1, wherein the compound of formula (2) is water or an aliphatic alcohol.

10. The method of claim 1, wherein the compound of formula (2) is isopropanol or pentan-1-ol.

11. The method of claim 1, wherein the molar ratio of (co)polymerization additive with respect to catalyst is from 0.5:1 to 2:1.

12. The method of claim 1, wherein the molar ratio of (co)polymerization additive with respect to catalyst is from 0.5:1 to 5:1.

13. The method of claim 11, wherein said contacting occurs at a temperature between −20° C. and approximately 150° C.

14. The method of claim 13, wherein said contacting occurs in solution at a temperature between 0° C. and 30° C.

15. The method of claim 11, wherein said contacting occurs between a few minutes and 48 hours.

* * * * *